United States Patent
Xu et al.

(10) Patent No.: US 8,107,726 B2
(45) Date of Patent: Jan. 31, 2012

(54) SYSTEM AND METHOD FOR CLASS-SPECIFIC OBJECT SEGMENTATION OF IMAGE DATA

(75) Inventors: Ning Xu, Irvine, CA (US); Arunkumar Mohananchettiar, Berwyn Heights, MD (US)

(73) Assignee: Samsung Electronics Co., Ltd., Suwon (KR)

( * ) Notice: Subject to any disclaimer, the term of this patent is extended or adjusted under 35 U.S.C. 154(b) by 870 days.

(21) Appl. No.: 12/141,824

(22) Filed: Jun. 18, 2008

(65) Prior Publication Data

US 2009/0316988 A1 Dec. 24, 2009

(51) Int. Cl.
G06K 9/34 (2006.01)
(52) U.S. Cl. ........ 382/173; 382/224; 382/190; 382/103; 345/619; 345/666
(58) Field of Classification Search .................. None
See application file for complete search history.

(56) References Cited

U.S. PATENT DOCUMENTS

| | | | |
|---|---|---|---|
| 5,548,661 A | 8/1996 | Price et al. | |
| 5,594,469 A | 1/1997 | Freeman et al. | |
| 5,790,692 A | 8/1998 | Price et al. | |
| 7,099,505 B2 | 8/2006 | Li et al. | |
| 7,199,803 B2 | 4/2007 | Shin et al. | |
| 7,200,266 B2 | 4/2007 | Ozer et al. | |
| 7,245,767 B2 | 7/2007 | Moreno et al. | |
| 2008/0112593 A1* | 5/2008 | Ratner et al. | 382/103 |
| 2009/0087024 A1* | 4/2009 | Eaton et al. | 382/103 |

OTHER PUBLICATIONS

E. Borenstein, E. Sharon, and S. Ulman. Combining top-down and bottom-up segmentation. *CVPR POCV, Washington*, 2004.
E. Borenstein and S. Ulman. Class-specific, top-down segmentation. In *ECCV*(2), pp. 109-124, 2002.
E. Borenstein and J. Malik. Shape guided object segmentation. In *IEEE Conference on Computer Vision and Pattern Recognition*, pp. 969-976, 2006.
Yuri Boykov, Olga Veksler, and Ramin Zabih. Fast approximate energy minimization via graph cuts. *IEEE Transactions on Pattern Analysis and Machine Intelligence*, Nov. 2001.
Piotr Dollar, Zhuowen Tu, and Serge Belongie. Supervised learning of edges and object boundaries. *IEEE Conference on Computer Vision and Pattern Recognition*, Jun. 2006.
Pedro F. Felzenszwalb. Efficient graph-based image segmentation. In *International Journal of Computer Vision*, Sep. 2004.
J. Friedman, T. Hastie, and R. Tibshirani. Additive logic regression: a statistical view of boosting. *Annals of Statistical*, 2000.

(Continued)

*Primary Examiner* — Jason M Repko
*Assistant Examiner* — Siamak Harandi

(57) ABSTRACT

Systems and methods for processing an image to determine whether segments of the image belong to an object class are disclosed. In one embodiment, the method comprises receiving digitized data representing an image, the image data comprising a plurality of pixels, segmenting the pixel data into segments at a plurality of scale levels, determining feature vectors of the segments at the plurality of scale levels, the feature vectors comprising one or more measures of visual perception of the segments, determining one or more similarities, each similarity determined by comparing two or more feature vectors, determining, for each of a first subset of the segments, a first measure of probability that the segments is a member of an object class, determining probability factors based on the determined first measures of probability and similarity factors based on the determined similarities, and performing factor graph analysis to determine a second measure of probability for each of a second subset of the segments based on the probability factors and similarity factors.

24 Claims, 7 Drawing Sheets

OTHER PUBLICATIONS

Frank R. Kschischang, Brendan J. Frey, and Hans-Andrea Loeliger. Factor graphs and the sun-product algorithm. *IEEE Transactions on Information Theory*, vol. 47(2): 498-519, Feb. 2001.

L. Liu and S. Sclaroff. Region segmentation via deformable model-guided split and merge. *ICCV*(1), 2001.

Jordan Reynolds and Kevin Murphy. Figure-ground segmentation using a hierarchical conditional random field. In *Fourth Canadian Conference on Computer and Robot Vision*, pp. 175-182, 2007.

J. Shi and J. Malik. Normalized cuts and image segmentation. In *IEEE Conference on Computer Vision and Pattern Recognition*, pp. 731-737, 1997.

Antonio Torralba, Kevin P. Murphy, and William T. Freeman. Sharing visual features for multiclass and multiview object detection. *IEEE Transactions on Pattern Analysis and Machine Intelligence*, vol. 29, No. 5, May 2007.

Z. Tu. Probabilistic boosting-tree: Learning discriminative models for classification, recognition, and clustering. *ICCV*, 2005.

Y. Weiss. Segmentation using eigenvectors: A unifying view. In *International Conference on Computer Vision* (2), pp. 975-982, 1999.

J. Winn, A. Criminisi, and T. Minka. Object categorization by learned universal visual dictionary. *IEEE Conference on Computer Vision and Pattern Recognition*, 2005.

\* cited by examiner

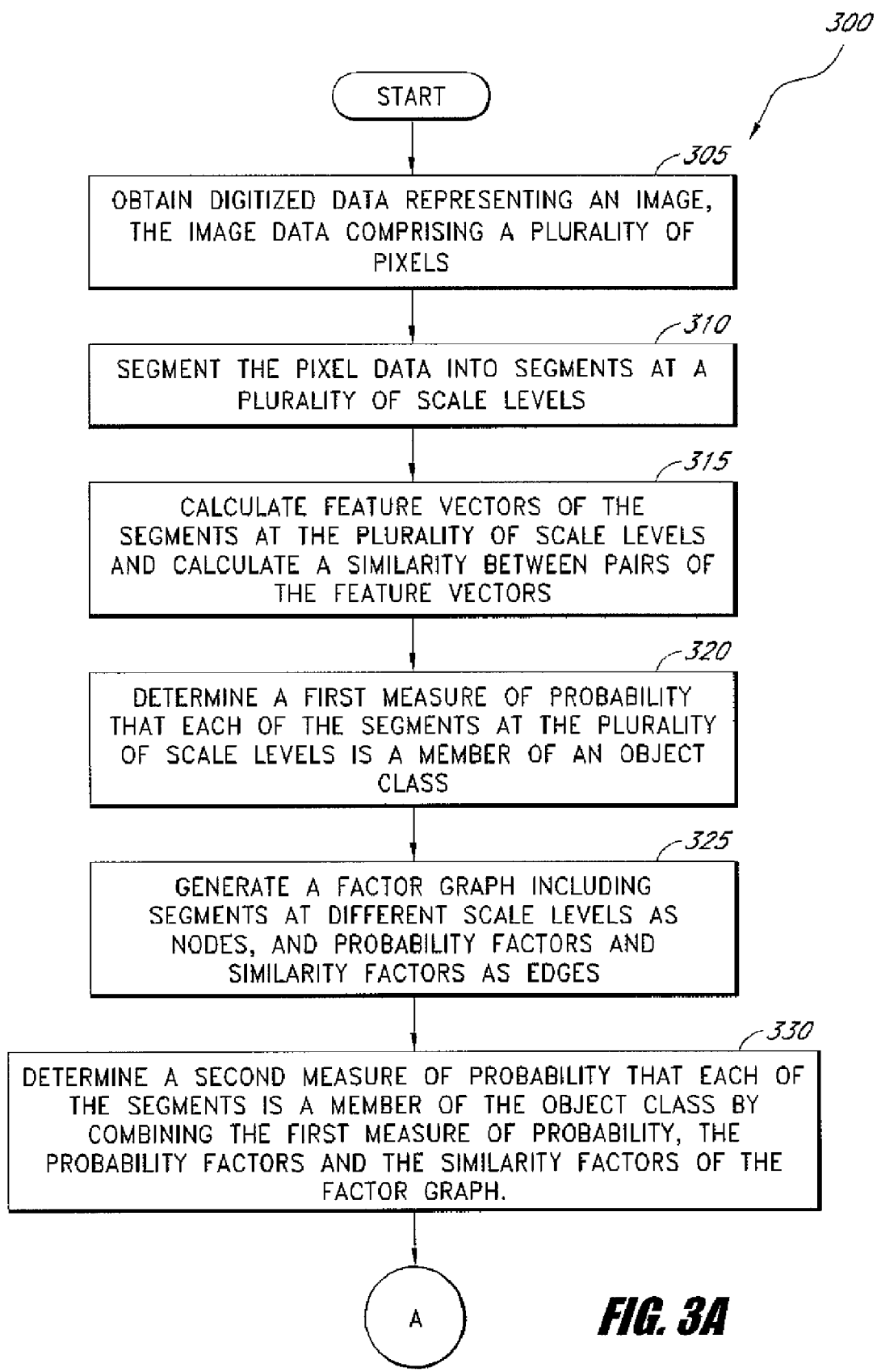

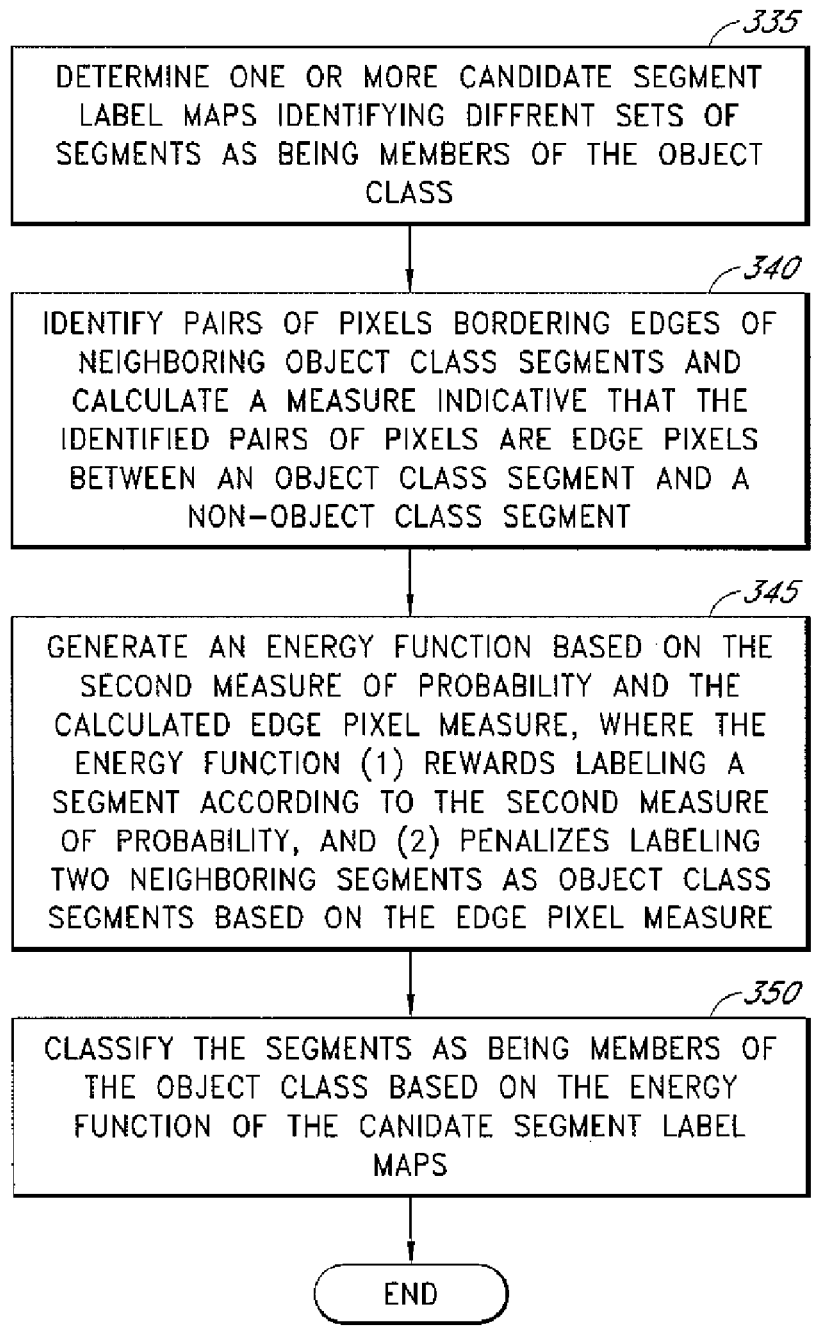

SYSTEM AND METHOD FOR CLASS-SPECIFIC OBJECT SEGMENTATION OF IMAGE DATA

BACKGROUND OF THE INVENTION

1. Field of the Invention

The invention is related to video processing. More particularly, the invention is related to detection and segmentation of a learned class of objects in video data.

2. Description of the Related Art

Recent developments in digital imagery, digital video and the increase in capacity of data storage have produced many types of automatic object recognition and object identification. Improvements in the precision of digital cameras and other image capture systems have provided unprecedented amounts of data to by analyzed and used by various analysis methods. Improvements in processing speeds have allowed for increased performance and more detailed analysis, but efficient analysis is still beneficial in terms of time and power savings.

Image segmentation involves partitioning a digital image into multiple regions (groups of pixels). One of the goals of segmentation is to simplify and/or change the representation of an image into something that is more meaningful and easier to analyze. Image segmentation is typically used to locate objects and boundaries (lines, curves, etc.) in images. The result of image segmentation is a set of regions that collectively cover the entire image, or a set of contours extracted from the image (see edge detection). Typically, each of the pixels in a region is similar with respect to some characteristic or computed property, such as color, intensity, or texture. Adjacent regions are different with respect to similar characteristics. Image segmentation can be performed at very fine scales due to the larger pixel densities afforded by modern image capture systems. However, very fine scale segmentation drives up the power consumption necessary to perform segmentation. Image segmentation at larger scales can improve the efficiency of the segmentation process, but accuracy can be degraded.

Given image segments for a known class of objects (e.g., a set of pre-segments object images), a classifier model can be learned from the known images to automatically categorize the objects in future images. Simple classifiers built based on some image feature of the object tend to be weak in categorization performance. Using boosting methods for object categorization is a way to unify the weak classifiers in a special way to boost the overall ability of categorization. Again, due to the fine detail available in image capture equipment, object classification can be performed at a very fine scale given adequate processing power and time. Object classification can also be performed at larger scales to speed up the process at the expense of accuracy.

SUMMARY OF CERTAIN INVENTIVE ASPECTS

The systems and methods of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the sample features of this invention provide advantages that include more robust and efficient segmentation and identification of images in one or more class of objects.

One aspect of the invention is a method of processing an image, comprising receiving digitized data representing an image, the image data comprising a plurality of pixels, segmenting the pixel data into segments at a plurality of scale levels, determining feature vectors of the segments at the plurality of scale levels, the feature vectors comprising one or more measures of visual perception of the segments, determining one or more similarities, each similarity determined by comparing two or more feature vectors, determining, for each of a first subset of the segments, a first measure of probability that the segments is a member of an object class, determining probability factors based on the determined first measures of probability and similarity factors based on the determined similarities, and performing factor graph analysis to determine a second measure of probability for each of a second subset of the segments based on the probability factors and similarity factors.

Another aspect of the invention is a system for processing an image, comprising a video subsystem configured to receive digitized data representing an image, the image data comprising a plurality of pixels, an image segmentation subsystem configured to segment the pixel data into segments at a plurality of scale levels, a perceptual analysis subsystem configured to determine feature vectors of the segments at the plurality of scale levels, the feature vectors comprising one or more measures of visual perception of the segments, and to determine one or more similarities, each similarity determined by comparing two or more feature vectors, an object classification subsystem configured to determine, for each of a first subset of the segments, a first measure of probability that the segment is a member of an object class, and a statistical analysis subsystem configured to determine probability factors based on the determined first measures of probability and similarity factors based on the determined similarities and further configured to perform factor graph analysis to determine a second measure of probability for each of a second subset of the segments based on the probability factors and similarity factors.

BRIEF DESCRIPTION OF THE DRAWINGS

FIG. 3 is a flowchart illustrating a method of detecting objects in an image.

DETAILED DESCRIPTION OF CERTAIN INVENTIVE EMBODIMENTS

The following detailed description is directed to certain specific sample aspects of the invention. However, the invention can be embodied in a multitude of different ways as defined and covered by the claims. In this description, reference is made to the drawings wherein like parts are designated with like numerals throughout.

Computer vision is the science and technology of automated image analysis enabling machines to see and analyze image data for various pieces of information. The image data can take many forms, such as single images, a video sequence, views from multiple cameras, or multi-dimensional data such as from a medical scanner.

A digital image is produced by one or several image sensors which, besides various types of light-sensitive cameras, includes range sensors, tomography devices, radar, ultrasonic cameras, etc. Depending on the type of sensor, the resulting image data is an ordinary 2D image, a 3D volume, or an image sequence. The pixel values typically correspond to light intensity in one or several spectral bands (e.g., gray images or color images), but can also be related to various physical measures, such as depth, absorption or reflectance of sonic or electromagnetic waves, or nuclear magnetic resonance. As used herein, digital image data (or image data) is defined to include any of the forms of visual images or non-visual images known to skilled technologists.

In some aspects, computer vision seeks to apply the theories and models of computer vision to perform various tasks in computer vision systems. Examples of applications of computer vision systems include, for example, process control (e.g. an assembly line robot), visual surveillance for detecting events or presence of people or things, identifying and organizing image information contained in databases, and human machine interaction.

Figure 1A:
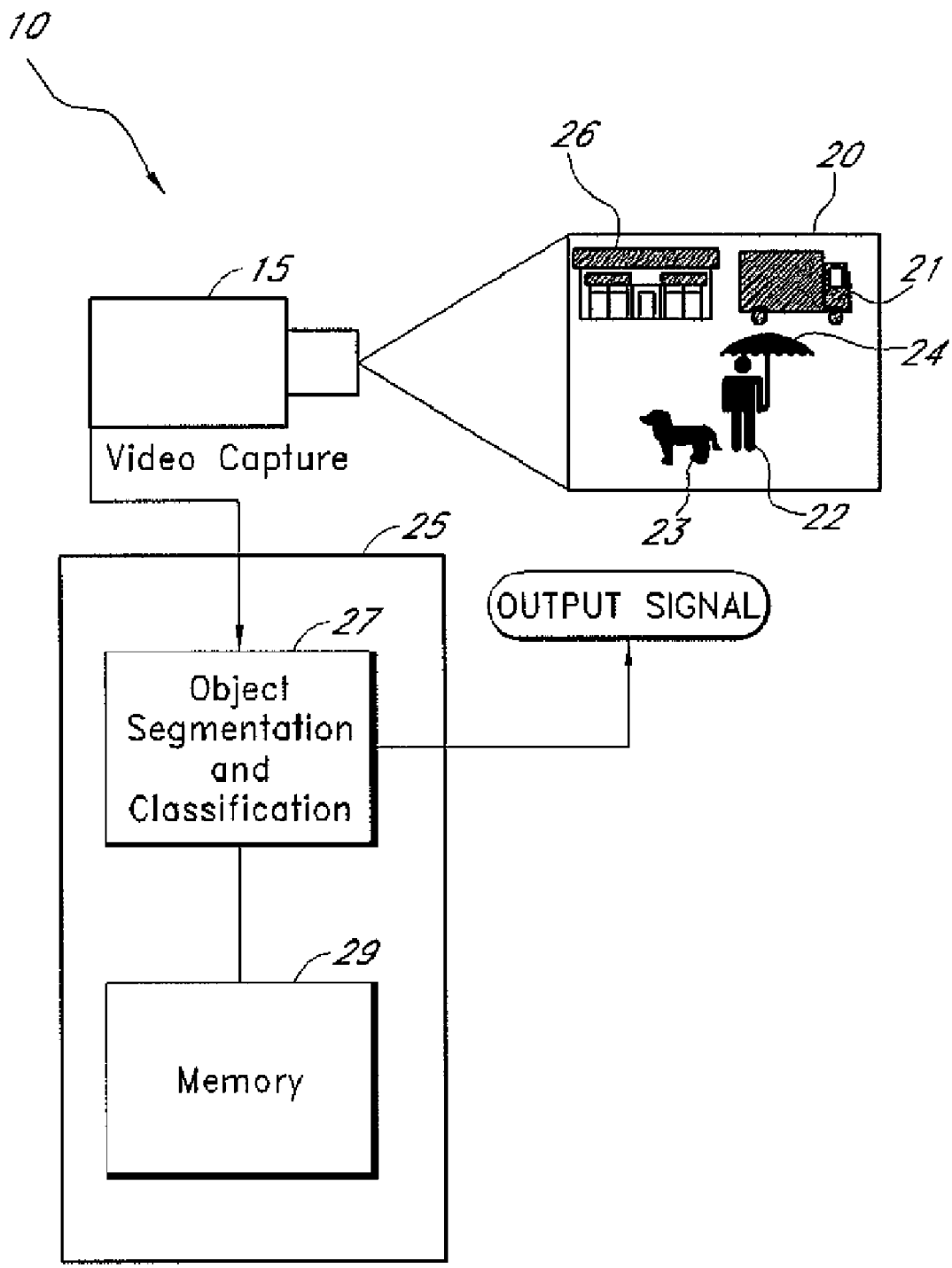
FIG. 1A is a functional block diagram of an exemplary computer vision system utilizing an embodiment of object segmentation and classification for video surveillance.

FIG. 1A is a functional block diagram of an exemplary computer vision system 10 utilizing an embodiment of object segmentation and classification for video surveillance. The system 10 includes a video (or image) capture device 15 that captures image data of a scene 20. In some embodiments, the video capture device 10 can be controllable such that the scene 20 being surveyed can be in various positions. In other embodiments, the video capture device 10 is static and the scene 20 remains fixed. The video (or image) capture device 10 can include cameras of varying complexity such as, for example, a "webcam" as is well-known in the computer field, or more sophisticated and technologically advanced cameras.

Image data that is captured by the video capture device 10 is communicated to a video analysis system 25. The video analysis system can comprise a personal computer or other type of computer system including one or more processors. The processor may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processor may be any conventional special purpose microprocessor such as a digital signal processor.

The video analysis system 25 includes an object segmentation and classification system 27. The object segmentation and classification system 27 performs the functions used to analyze the captured image data received from the video capture device 15. The object segmentation and classification system 27 can be designed to segment one or more classes of objects that may appear in the scene 20 being surveyed by the video capture device. For example, one class of objects may be vehicles such as a truck 21 illustrated in the scene 20. Another class of objects may include people such as the person 22 illustrated in the scene 20. The object segmentation and classification system 27 is designed to detect a member of the object class in an image of the scene 20 captured by the video capture device 15. The object segmentation and classification system 27 can identify members of the object class while other non-class objects are in the background or foreground of the captured image. Such non-class objects may include, for example, a dog 23, an umbrella 24, and a building 26 as illustrated in the scene 20.

In some embodiments, the object segmentation and classification system 27 saves information indicative of the presence of a member of the object class being present into memory 29 in the video analysis system 25. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), which are directly connected to the one or more processors of the video analysis system 25. Other types of memory include bubble memory and core memory. In some embodiments, the object segmentation and classification system 27 communicates information indicative of the presence of a member of the object class being present using an output signal device 30. The output signal could be an alarm, audible and/or visual or any form of digital information such as text.

Figure 1B:
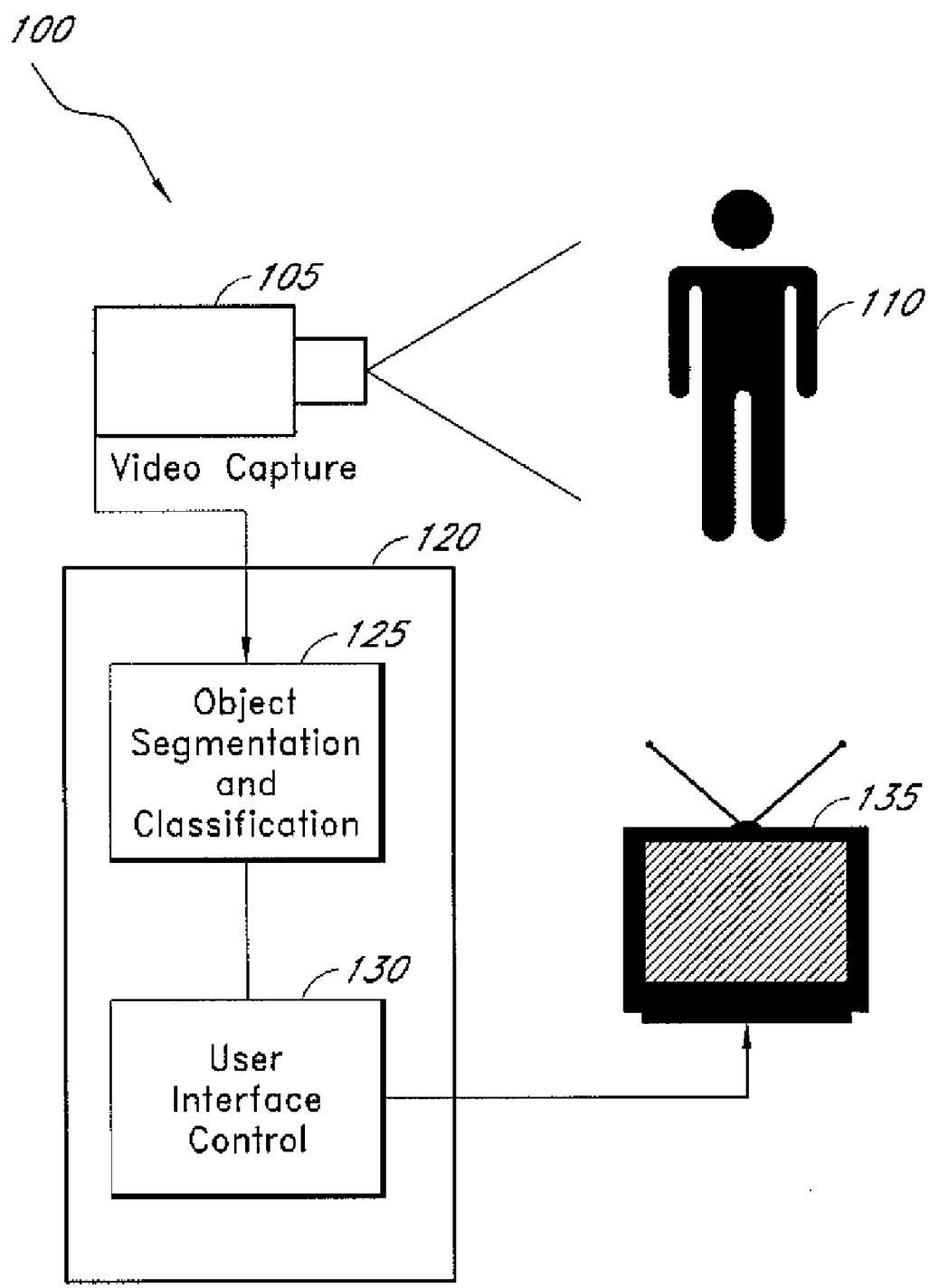
FIG. 1B is a functional block diagram of another exemplary computer vision system utilizing an embodiment of object segmentation and classification for control of a television via a human-machine interface.

FIG. 1B is a functional block diagram of another exemplary computer vision system utilizing an embodiment of object segmentation and classification for control of a television via a human machine interface. The video system 100 is used to enable a user 110 to control a television 135 using hand motion, for example. In this embodiment, the video system 100 includes a video capture device 105, such as a digital video camera. The video capture device 105 obtains digital images of the user 110. In some embodiments, the video capture device 105 can be controllable, e.g., using motion detection, such that the video capture device tracks the user 110. In other embodiments, the video capture device 105 is static. The video (or image) capture device 104 can include cameras of varying complexity such as, for example, a "webcam" as is well-known in the computer field, or more sophisticated and technologically advanced cameras.

Image data that is captured by the video capture device 105 is communicated to a video analysis system 120. The video analysis system 120 can comprise a personal computer or other type of computer system including one or more processors. The processor may be any conventional general purpose single- or multi-chip microprocessor such as a Pentium® processor, Pentium II® processor, Pentium II® processor, Pentium IV® processor, Pentium® Pro processor, a 8051 processor, a MIPS® processor, a Power PC® processor, or an ALPHA® processor. In addition, the processor may be any conventional special purpose microprocessor such as a digital signal processor. The video analysis system 120 also includes memory, not shown. The memory can include any of the memories discussed above in reference to the memory 29 in FIG. 1A.

The video analysis system 120 includes an object segmentation and classification system 125 and a user interface control system 130. The object segmentation and classification system 125 performs the functions used to analyze the captured image data received from the video capture device 105. The object segmentation and classification system 125 can be designed to segment one or more classes of objects that may be used by the user 110 for purposes of controlling the television 135 via the user interface control 130. For example, in some embodiments, the object class that the object segmentation and classification system 125 is designed to distinguish includes a hand or hands of the user 110. In other embodiments, the object class that the object segmentation and classification system 125 is designed to distinguish includes a foreign object such as a pointer or wand that is held by the user 110. The object segmentation and classification system 125 is designed to detect a member of the object class (e.g., a hand or a foreign object) in the image data captured by the video capture device 105.

The user interface control system 130 receives class object location data from the object segmentation and classification system 125. In some embodiments, the class object location data is indicative of the location of the hand of the user 110 relative to a portion of the screen of the television 135. Using the hand location data, the user interface control system 130 determines hand gestures or motions that the user is performing. Such gestures are used by the user interface control system 130 to perform predetermined functions such as controlling the volume, changing channels, etc. Examples of hand gestures used by the user 110 as well as functions performed by the user interface control system 130 are described in U.S. patent application Ser. No. 12/037,033 entitled SYSTEM AND METHOD FOR TELEVISION CONTROL USING HAND GESTURES, filed Feb. 25, 2008, herein incorporated by reference in its entirety.

The systems 10 and 100 illustrated in FIGS. 1A and 1B are examples of computer vision systems that can utilize embodiments of the object segmentation and classification system and methods described herein. The embodiments include segmenting objects of a known class from images by a fusion of various object segmentation, classification and edge identification analysis techniques. Efficiency and accuracy are improved by performing one or more of the segmentation, classification and edge identification at multiple scales. In one aspect, the analysis techniques employed include 1) deriving bottom-up information from intensity differences using a graph based segmentation of the image into components at multiple scales, 2) determining top-down measures of probability that segments are members of an object class using one or more learned class-specific boosting classifier models and 3) fusing the bottom-up information and the top-down measures of probability using a factor graph, resulting in a second improved measure of probability that segments are a members of the object class.

Some embodiments also include determining object boundary or edge information from a boosting-based edge learning model trained to detect boundaries of the object class(es). In these embodiments, final segment classification is obtained by combining this probability with the object boundary probability obtained from the boosted edge learning model (BEL). The performance of these embodiments has proven to be significantly better than previous object classification methods.

Figure 2:
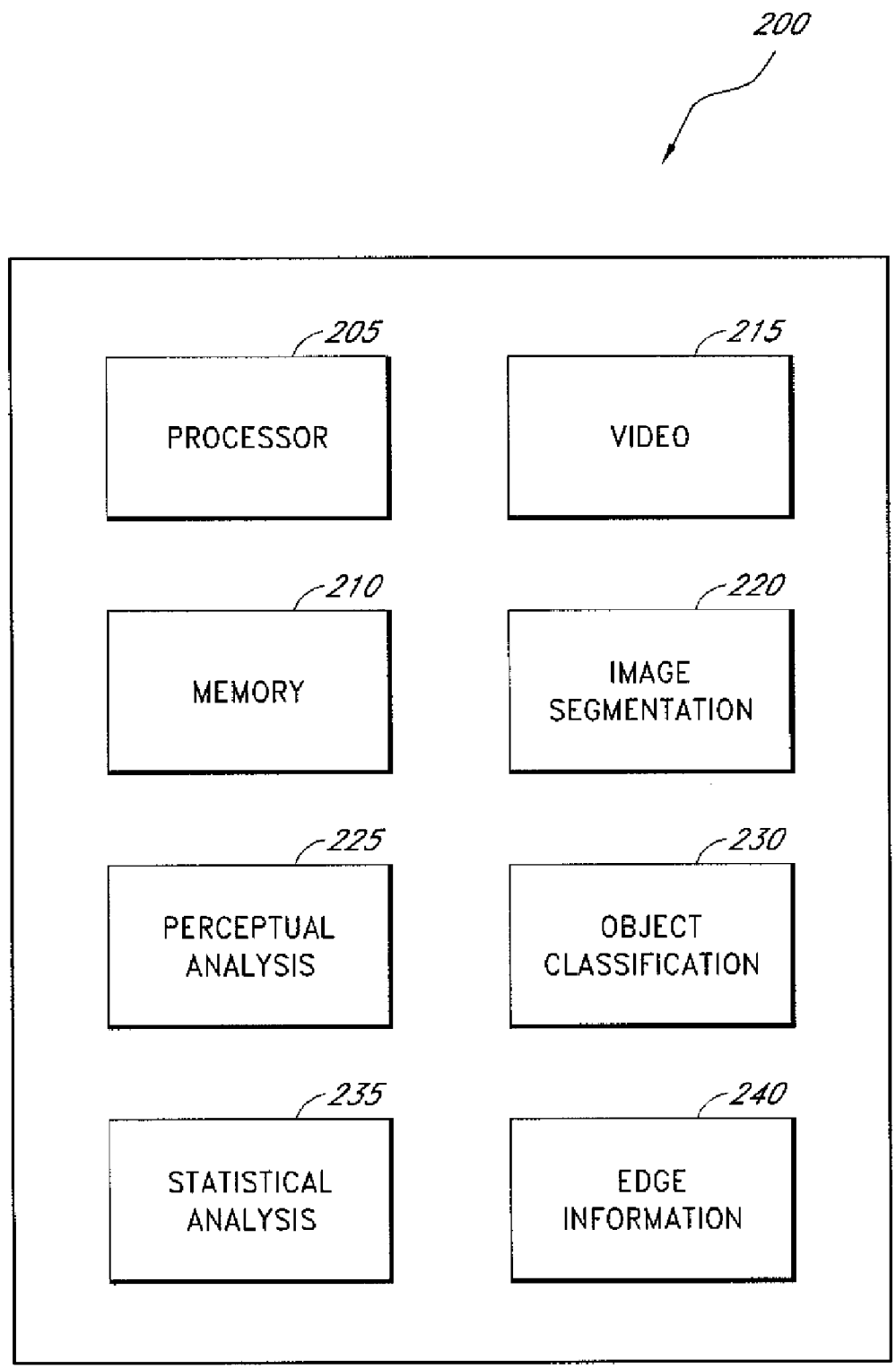
FIG. 2 is a block diagram illustrating an embodiment of an object segmentation and classification system used for computer vision systems such as illustrated in FIGS. 1A and 1B.

FIG. 2 is a block diagram illustrating an embodiment of an object segmentation and classification system 200 that may be used for the object segmentation and classification systems 27 and 125 of the computer vision systems 10 and 100 illustrated in FIGS. 1A and 1B. In this embodiment, the object segmentation and classification system 200 comprises a processor element 205, a memory element 210, a video subsystem 215, an image segmentation subsystem 220, a perceptual analysis subsystem 225, an object classification subsystem 230, a statistical analysis subsystem 235, and an optional edge information subsystem 235.

The processor 205 may include one or more of a general purpose processor and/or a digital signal processor and/or an application specific hardware processor. The memory 210 may include, for example, one or more of integrated circuits or disk-based storage or any readable and writeable random access memory device. The processor 205 is coupled to the memory 210 and the other elements to perform the various actions of the other elements. In some embodiments, the video subsystem 215 receives video data over a cable or wireless connection such as a local area network, e.g., from the video capture device 15 or 105 in FIGS. 1A and 1B. In other embodiments, the video subsystem 215 may obtain the video data directly from the memory element 210 or one or more external memory devices including memory discs, memory cards, internet server memory, etc. The video data may be compressed or uncompressed video data. In the case of compressed video data stored in the memory element 210 or in the external memory devices, the compressed video data may have been created by an encoding device such as the video capture device 27 or 125 in FIG. 1A or 1B. The video subsystem 215 can perform decompression of the compressed video data in order for the other subsystems to work on the uncompressed video data.

The image segmentation subsystem 220 performs tasks associated with segmentation of the image data obtained by the video subsystem 215. Segmentation of the video data can be used to significantly simplify the classification of different objects in an image. In some embodiments, the image segmentation subsystem segments the image data into objects and background present in the scene. One of the main difficulties lies in the definition of segmentation itself. What defines a meaningful segmentation? Or, if it is desirable to segment the image into various objects in the scene, what defines an object? Both questions can be answered when we address the problem of segmenting out objects of a given class, say, human hands, or faces. Then the problem is reduced to one of labeling image pixels into those belonging to objects of the given class and those belonging to the background. Objects of a class come in various poses and appearances. The same object can give different shapes and appearances depending on the pose and lighting in which the image was taken. To segment out an object despite all these variabilities may be a challenging problem. That being said, significant progress has been made in the segmentation algorithms over the past decade.

In some embodiments, the image segmentation subsystem 220 uses a segmentation method known as bottom-up segmentation. The bottom-up segmentation approach, in contrast to segmentation directly into objects of a known class, makes use of the fact that usually intensity, color, and texture discontinuities characterize object boundaries. Therefore one can segment the image into a number of homogeneous regions and then later classify those segments belonging to the object (e.g., using the object classification subsystem 230). This is often done without regard to any particular meaning of the components but only following the uniformity of intensity and color of the component regions and sometimes the shape of the boundaries.

The goal of bottom-up segmentation, generally, is to group perceptually uniform regions in an image together. Considerable progress in this area was achieved by eigenvector-based methods. Examples of eigenvector-based methods are presented in "Normalized cuts and image segmentation, by J. Shi and J. Malik, IEEE Conference on Computer Vision and Pattern Recognition, pages 731-737, 1997; and "Segmentation using eigenvectors: A unifying view," by Y. Weiss, International Conference on Computer Vision (2), pages 975-982, 1999. These methods can be excessively complicated for some applications. Certain other fast approaches fail to produce perceptually meaningful segmentations. Pedro F. Felzenszwalb developed a graph-based segmentation method (See "Efficient graph-based image segmentation," International Journal of Computer Vision, September 2004.) which is computationally efficient and gives useful results comparable to the eigenvector-based methods. Some embodiments of the image segmentation subsystem 220 utilize segmentation methods similar to those presented by Felzenswalb for the bottom-up segmentation. However, the image segmentation subsystem 220 can use any of these segmentation methods or other segmentation methods known to skilled technologists. Details of the functions performed by some embodiments of the image segmentation subsystem 220 are discussed below.

The image segmentation subsystem 220 can be performed at multiple scales, where the size of the segments varies. For example, the scale levels can be selected to include segments smaller than the expected size of objects being classified, as well as segments larger than the expected size of the objects being classified. In this way, the analysis performed by the object segmentation and classification system 200, as a whole, can be a balance of efficiency and accuracy.

The perceptual analysis subsystem 225 calculates feature vectors comprising one or more measures of visual perception for the segments that were identified by the image segmentation subsystem 220. The term "feature vector" is intended to include all kinds of measures or values that can be used to distinguish one or more properties of pixels. The values of the feature vectors can include one or more of intensity, color and texture. In some embodiments, the feature vector values comprise histograms of intensity, color, and/or texture. Color feature vectors can include one or more histograms for hue such as, for example, red, green, or blue.

Color feature vectors can also include histograms representing the saturation or degree of purity of the colors, where saturation is a measure of texture. In some embodiments, Gabor filters are used to generate feature vector values representative of texture. Gabor filters at various orientations may be in order to identify textures in different directions on the image. In addition, Gabor filters of different scales can be used, where the scale determines the number of pixels, and therefore the textural precision, that the Gabor filters can target. Other feature vector values that may be used by the perceptual analysis subsystem 225 include Haar filter energy, edge indicators, frequency domain transforms, wavelet based measures, gradients of pixel values at various scales, and others known to skilled technologists.

In addition to calculating the feature vectors for the segments, the perceptual analysis subsystem 225 also computes similarities between pairs of feature vectors, e.g., feature vectors corresponding to pairs of neighboring segments. As used herein, a "similarity" may be value, or set of vales, measuring how similar two segments are. In some embodiments, the value is based on the already-calculated feature vector. In other embodiments, the similarity may be calculated directly. Although "similar" is a term of art in geometry, roughly indicating that two objects have the same shape but different size, as used herein, "similar" has the normal English meaning including sharing, to some degree, some property or characteristic trait, not necessarily shape. In some embodiments, these similarities are utilized by the statistical analysis subsystem 235 as edges in a factor graph, the factor graph being used to fuse the various outputs of the image segmentation subsystem 220 and the object classification subsystem 230. The similarities can be in the form of a Euclidean distance between feature vectors of two segments, or any other distance metric such as, for example, the 1-norm distance, the 2-norm distance, and the infinity norm distance. Other measures of similarity known to those skilled in the art may also be used. Details of the functions performed by the perceptual analysis subsystem are discussed below.

The object classification subsystem 230 performs analysis of the segments identified by the image segmentation subsystem in order to generate a first measure of probability that the segments are members of the one or more object classes being identified. The object classification subsystem 230 can utilize one or more learned boosting classifier models, the one or more boosting classifier models being developed to identify whether portions of image data are likely to be members of the one or more object classes. In some embodiments, different learned boosting classifier models are generated (e.g., using a supervised learning method) separately for each of the scale levels into which the image segmentation subsystem 220 segmented the pixel data.

The boosting classifier model can be generated, e.g., using a supervised learning method, by analyzing pre-segmented images that contain segments that have been designated as members of the object class and other segments that are not members of the object class. In some embodiments, it is desirable to segment highly non-rigid objects like hands. In these embodiments, the pre-segmented images should contain many different object configurations, sizes and colors. This will enable the learned classifier model to make use of the object class-specific knowledge contained in the pre-segmented images to arrive at a segmentation algorithm.

The boosting classifier can use intensity, color, and texture features and hence can deal with pose variations typical of non-rigid transformations. In some embodiments, the boosting classifier is trained based on the feature vectors that are generated for the pre-segmented image segments by the perceptual analysis subsystem 225. In this way, the learned boosting classifier models will take the feature vectors as input during the actual (as opposed to the supervised training) object segmentation and classification process. As discussed above, the feature vectors may include one or more measures of color, intensity and texture and perform adequately to distinguish several different object types in the same image.

Since objects such as hands, faces, animals, and vehicles can take several different orientations, and in some cases be very non-rigid and/or reconfigurable (e.g., hands with different finger positions, or cars with open doors or a lowered convertible roof, the pre-segmented images can contain as many orientations and/or configurations as possible.

In addition to containing the learned boosting classifier models and determining the first measure of probability that the segments are members of the object class, the object classification subsystem 230 also interfaces with one or more of the perceptual analysis subsystem 225, the statistical analysis subsystem 235 and, in some embodiments, the edge information subsystem 240 in order to fuse together statistically the similarity measures, the first probability measures and measures indicative of edges in making the final classification.

In some embodiments, the object classification subsystem 230 determines multiple candidate segment label maps with each map labeling segments differently (e.g., different object and non-object segment labels). The different segment label maps are then analyzed by the object classification subsystem 230, by interfacing with the statistical analysis subsystem 235, to determine the final classification based on one or more second measures of probability and/or energy functions designed to fuse two or more of the similarity measures, the first probability measures, and the edge measures. Details of the statistical fusing methods are discussed below.

The statistical analysis subsystem 235 performs the functions related to the various statistical means by which the measures generated by the other subsystems are fused together. The statistical analysis subsystem 235 generate factor graphs including the segments generated by the image segmentation subsystem 220 as nodes.

In some embodiments, one or more of the elements of the object segmentation and classification system 200 of FIG. 2 may be rearranged and/or combined. The elements may be implemented by hardware, software, firmware, middleware, microcode or any combination thereof. Details of the actions performed by the elements of the object segmentation and classification system 200 will be discussed in reference to the methods illustrated in FIG. 3 below.

FIG. 3 is a flowchart illustrating a method of detecting objects in an image. The procedure 300 begins by obtaining digitized data representing an image, the image data comprising a plurality of pixels 305. The image data may represent one of a plurality of images in a sequence to form a video. The image data may be in a variety of formats, including but not limited to BMP (bitmap format), GIF (Graphics Interchange Format), PNG (Portable Network Graphics), or JPEG (Joint Photographic Experts Group). The image data may be in other forms utilizing one or more of the features represented by the above-mentioned formats such as methods of compression. The image data may also be obtained in an uncompressed format, or at least, converted to an uncompressed format.

The image data is segmented into a number of segments at plurality of scale levels 310. For example, the image may be segmented into 3 segments at a "course" level, 10 segments at a "medium" level, and 24 segments at a "fine" level. The number of levels may be three, five, or any number of levels. One level may be used in some cases. In one embodiment, the segments at a given scale level are non-overlapping. However, the segments at different scale levels may overlap, e.g. by specifying the same pixels as belonging to two segments at different scale levels. The segmentation may be complete, that is, at a single scale level, each pixel may be assigned to one or more segments. In other embodiments, the segmentation may be incomplete and some pixels of the image may not be associated with a segment at that scale level. A number of segmentation methods are described in detail later in this disclosure.

In the next stage of the process, feature vectors of the segments at the plurality of scale levels are calculated, as are similarities between pairs of the feature vectors 315. As mentioned above, a feature vector includes all kinds of measures or values that can be used to distinguish one or more properties of pixels. The values of the feature vectors can include one or more of intensity, color, and texture. In some embodiments, the feature vector values comprise histograms of intensity, color, and/or texture. Color feature vectors can include one or more histograms for hue such as, for example, red, green, or blue. Color feature vectors can also include histograms representing the saturation or degree of purity of the colors, where saturation is a measure of texture. In some embodiments, Gabor filters are used to generate feature vector values representative of texture. Gabor filters at various orientations may be in order to identify textures in different directions on the image. In addition, Gabor filters of different scales can be used, where the scale determines the number of pixels, and therefore the textural precision, that the Gabor filters can target. Other feature vector values that may be used in this stage of the process include Haar filter energy, edge indicators, frequency domain transforms, wavelet-based measures, gradients of pixel values at various scales, and others known to skilled technologists. Similarities between pairs of feature vectors, e.g., feature vectors corresponding to pairs of neighboring segments, are also calculated. The similarities can be in the form of a Euclidean distance between feature vectors of two segments, or any other distance metric such as, for example, the 1-norm distance, the 2-norm distance, and the infinity norm distance. Similarity may also be measured as a correlation between the two feature vectors. Other measures of similarity known to those skilled in the art may also be used. Similarities between two segments can also be calculated directly, bypassing the need for feature vectors. Although "correlation" is a term of art in mathematics, indicating, in one definition, the conjugate of a vector multiplied by the vector itself, as used herein "correlation" may also have the normal English meaning including a measure of the relationship between two objects, such as segments, vectors, or other variables.

The next stage of the process involves determining a first measure of probability that each of the segments at the plurality of scale levels is a member of an object class 320. In other embodiments, a first measure of probability is only determined for a subset of the segments. For example, the first measure of probability may only be determined for those segments away from the edges of the image, or only for those segments having a characteristic identified from the feature vectors. In general, a subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, of all of the elements of the set. Although "probability" is a term of art in mathematics and statistics, roughly indicating the number of times an event is expected to occur in a large enough sample, as used herein "probability" has the normal English meaning including the likelihood or chance that something is the case. Thus, the calculated probability may indeed correspond to the mathematical meaning, and obey the mathematical laws of probability such as Bayes' Rule, the law of total probability, and the central limit theorem. The probabilities may also be weights or labels ("likely"/"not likely") to ease computational costs at the possible expense of accuracy.

In the next stage of the process, a factor graph is generated including segments at different scale levels as nodes and probability factors and similarity factors as edges 325. Other methods of combining the information garnered about the object classification of the segments may be used. As a factor graph is a mathematical construct, an actual graph need not be constructed to achieve the same deterministic results. Thus, although it is described as generating a factor graph, it is understood that as this phrase is used herein to describe a method of combining information. The probability factors and similarity factors include the likelihood that a parent node should be classified as an object given the likelihood a child node has been so classified, the likelihood of a node should be classified as an object given the feature vector, the feature vector of the node itself, or the likelihood a node should be classified as an object given all other information.

With this information, a second measure of probability that each segment is a member of the object class is determined by combining the first measure of probability, the probability factors, and the similarity factors of the factor graph 330. As with the first measure of probability, in some embodiments, the determination of the second measure is only performed for a subset of the segments. As mentioned above, other methods of combining the information may be employed. It is also reiterated that although mathematical probabilities may be used in some embodiments, the term "probability" includes the likelihood or chance that something is the case, e.g., the likelihood that a segment belongs to an object class. As such, in some embodiments, the combining may be performed by adding weights or comparing labels instead of rigorous mathematical formulation.

At this point, one or more candidate segment label maps may be determined, each map identifying different sets of segments as being members of the object class 335. In one embodiment, each candidate segment label map is a vector of 1s and 0s, each element of the vector corresponding to a segment, each 1 indicating that the segment is a member of the object class, and each 0 indicating that the segment is not a member of the object class. In other embodiments, the candidate segment label maps may associate a probability that each segment belongs to an object class. Some embodiments of the invention may superimpose a candidate segment label map over the image to better visualize the proposed classification. The number of candidate segment label maps may also vary from embodiment to embodiment. In one embodiment, for example, only one candidate segment label map may be created. This map may be the most likely mapping or a random mapping. In other embodiments, many candidate segment label maps may be determined. A collection of candidate segment label maps including all possible mappings may be generated, or a subset including only the most likely mappings.

The one or more candidate segment label maps may further be associated with a probability that the candidate segment label map is correct. As above, this may be accomplished through a number of methods, including summing weights, comparing nominative labels, or using the laws of mathematical probability. In some embodiments, one of the candidate segment label maps may be chosen as the final label map and this may be used in other applications, such as user interface control. This choosing may be based on any of a number of factors. For example, the label map that is most likely correct may be chosen as the final label map. In other embodiments, the most likely label map may not be chosen to avoid errors in the application of the label map. For example, if the most likely label map indicates that no segments should be classified as objects, this label map may be ignored for a less likely mapping that includes at least one segment classified as an object. The chosen candidate segment label map may be used to finally classify each segment as being either an object or not an object. In other embodiments, the construction of one or more candidate segment label maps may be skipped and the segments themselves classified without the use of a mapping. For example, the segment most likely belonging to the object class may be output without classifying the other segments using a map.

In other embodiments, the candidate segment label maps are further refined using edge data. For example, the next stage of the process 300 involves indentifying pairs of pixels bordering edges of neighboring segments and calculating a measure indicative that each identified pair of pixels are edge pixels between an object class segment and a non-object class segment 340. Simple edge detection is well-known in image processing and a number of methods of calculating such a measure are discussed below.

Using this information may include generating an energy function based on the second measure of probability and the calculated edge pixel measure 345. In one embodiment, the energy function (1) rewards labeling a segment according to the second measure of probability and (2) penalizes labeling two neighboring segments as object class segments based on the edge pixel measure. Other methods may be used to incorporate edge information into the classification process. In one embodiment, for example, the energy function utilizes a smoothness cost, which is a function of two neighboring segments, and adds this to a data cost, which is a function of a single segment, or more particularly, the likelihood that a single segment belongs to an object class.

By combining the bottom-up, top-down, and edge information, the segments may now be classified as being members of the object class 350. In other embodiments, the edge information is not used, as mentioned above with regards to candidate segment label maps, and classification may be performed at an earlier stage of the process. One embodiment classifies the segments by minimizing the energy function calculated in the previous stage. Minimization methods, and optimization methods in general, are well-known in the art. Embodiments of the invention may use gradient descent, a downhill simplex method, Newton's method, simulated annealing, the genetic algorithm, or a graph-cut method.

At the conclusion of the process, the result is a classification for at least one segment as either belonging to an object class or not belonging to an object class. If the desired output is the location of an object, further processing may be performed to ascertain this information. Further, if the analyzed image is part of series of images, such as is the case with video data, the location of an object may be tracked and paths or trajectories may be calculated and output.

For example, if the object class includes human hands, the paths or trajectories formed by video analysis may be used as part of a human-machine interface. If the object class includes vehicles (cars, trucks, SUVs, motorcycles, etc.), the process may be employed to automate or facilitate traffic analysis. An automated craps table may be created by selected and training dice as the object class, tracking the thrown dice with a camera, and analyzing the resulting number when the dice have settled to rest. Facial recognition technology could be improved by classifying a segment as a face.

Image Segmentation

Just like the segmentation aids other vision problems, segmentation benefits from the other vision information as well. Some segmentation algorithms use the fact that object recognition may be used to aid object segmentation. Among these are the algorithms for figure-ground segmentation of objects of a known class. These algorithms often benefit from the integration of bottom-up and top-down cues simultaneously. The bottom-up approach makes use of the fact that intensity, color, and/or texture discontinuities often characterize object boundaries. Therefore, one can segment the image into a number of homogeneous regions and then identify those regions belonging to the object. This may be done without regard to any particular meaning of the components, for instance, by only following the uniformity of intensity and color of the component regions, or by including the shape of the boundaries. This alone may not result in a meaningful segmentation because the object region may contain a range of intensities and colors similar to the background. Thus, the bottom-up algorithms often produce components which mix object with background. On the other hand, top-down algorithms follow a complementary approach and make use of the knowledge of the object that the user is trying to segment out. Top-down algorithms look for the region which will resemble the object in shape and/or appearance. Top-down algorithms face the difficulty of dealing with appearance and shape variations of the objects and pose variations of the images. In "Class-specific, top-down segmentation," by E. Boresntein and S. Ullman, in ECCV(2), pages 109-124, 2002, the authors present a top-down segmentation method which is guided by a stored representation of the shape of the objects within the class. The representation is in the form of a dictionary of object image fragments. Each fragment has associated with it a label fragment which gives the figure-ground segmentation. Given an image containing an object from the same class, the method builds a cover of the object by finding a number of best matching fragments and the corresponding matching locations. This is done by correlating the fragments with the image. The segmentation is obtained by a weighted average of the corresponding fragment labels. The weight corresponds to the degree of match. The main difficulty with this approach is that the dictionary has to account for all possible variations of appearance and pose of the class objects. In the case of non-rigid objects, the dictionary can become impractically large.

Because of the complementary nature of the two cues, several authors have proposed combining both. Better results have been shown by algorithms which integrate both the cues. In "Region segmentation via deformable model-guided split and merge," by L. Lin and S. Scarloff, in ICCV(1), 2001, deformable templates are combined with bottom-up segmentation. The image is first over-segmented, and then various groupings and splittings are considered to best match a shape represented by a deformable template. This method faces difficult minimization in a high-dimensional parameter space. In "Comibining top-down and bottom-up segmentation," by E. Borsenstein, E. Sharon, and S. Ullman, in CVPR POCV, Washington, 2004, they apply image fragments for top-down segmentation and combine it with bottom-up criteria using a class of message-passing algorithms. In the following two sections, bottom-up and top-down segmentation methods are disclosed.

Bottom-Up Segmentation

Some embodiments of bottom-up segmentation employ a graph in which pixels are the nodes and the edges which connect neighboring pixels have weights based on the intensity similarity between them. The method measures the evidence for a boundary between two regions by comparing two quantities: one based on the intensity differences across the boundary and the other based on the intensity differences between neighboring pixels within each region. Although this method makes greedy decisions it produces segmentations that satisfy some global properties. The algorithm runs in time nearly linear in the number of image pixels and is also fast in practice. Since the evidence of a boundary may be decided based on the intensity difference between two components relative to the intensity differences within each of the components, the method is able to detect texture boundaries and boundaries between low-variability regions as well as high-variability regions. Color images may be segmented by repeating the same procedure on each of the color channels and then intersecting the three sets of components. For example, two pixels may be considered in the same component when they appear in the same component in all three of the color plane segmentations. Other method of segmenting color images may be used, including analysis of hue, saturation, and/or lightness or value.

Figure 4:
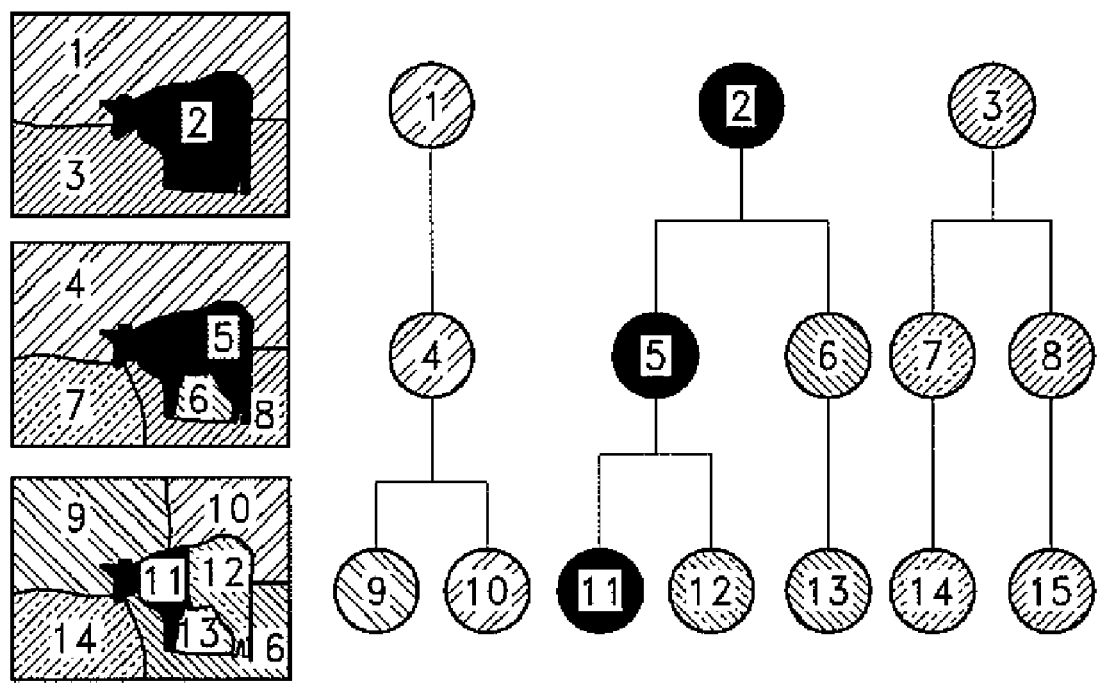
FIG. 4 is an illustration showing the use of multi-scale segmentation for the fusion of segmentation information at several scales using a tree formed from the components at different scales.

The aim of bottom-up segmentation is to break down the image along intensity and color discontinuities. Segmentation information is collected and used at a number of scales. For example, three scales are used for FIG. 4. FIG. 4 is an illustration showing the use of multi-scale segmentation for the fusion of segmentation information using a tree forms from the components at different scales. At the lowest scale, some components may be too fine to be recognized reliably and, similarly, at the highest scale, some components might be too big so as to confuse the classifiers. When segments are small, a top-down algorithm may more easily find a group of segments which together constitute the shape of the object. That means top-down information dominates the overall segmentation. On the other hand, when bottom-up segments are too big, it can become difficult to find any subset which can form the shape of the object. Often the segments can overlap with both foreground and background. A good trade-off is obtained by considering segmentation at a number of different scales. In a multi-scale decomposition as depicted in FIG. 4, the components receive high recognition scores at the scale in which they are most recognizable and the components at the other scales can inherit the labels from their parents. This is because relevant components which may not appear in one scale can appear in another. This benefits the top-down segmentation later by way of giving the boosting classifier information at multiple scales. In the example of FIG. 4, for example, segment 5 may be recognized by an object-classifying algorithm as being a cow. Segment 2 lacks this shape, as does segment 11 and 12. Thus, if segmentation were only performed at one scale, the object classifier may miss that there is a cow in this image. The information may be propagated through the tree to indicate that segment 2 includes a cow, and that segment 11 and 12 are parts of a cow. The hierarchy of segmentations may be produced by using the same segmentation algorithm with a number of different set of parameters. For example, for hand-image training, one might use three different sets of the parameters $\{\sigma, k, \text{ and } m\}$, where $\sigma$ represents a Gaussian filter parameter, k defines the scale which depends on the granulation of the image, and m defines a number of iterations to iteratively group the pixels. Three such sets of parameters, may be, for example, $\{1, 10, 50\}$, $\{1, 10, 100\}$ and $\{1, 10, 300\}$ for respectively the first, second and third scales. In another embodiment, different segmentation algorithms are used at the different scales.

The segmentations at different scales form a segmentation hierarchy which is converted to a tree-structured conditional random field (CRF) in which the segments form nodes and the edges express the geometrical relation between the components of different scales. It is used as a strong prior for enforcing bottom-up consistency in the final segmentation. This may be done, in some embodiments, by a belief propagation (BP) based inference on this tree after entering the node evidences (e.g., probabilities) given by the top-down classifier.

Top-Down Segmentation

Some embodiments of the invention are capable of segmenting highly non-rigid objects, such as hands, using a supervised-learning method based on boosting. This may enable the use of the object class-specific knowledge to perform segmentation. In one embodiment, the boosting classifier uses intensity, color, and texture features and hence can deal with pose variations and non-rigid transformations. It has been shown in "Object categorization by learned visual dictionary," by J. Winn, A. Criminisi, and T. Minka, IEEE Conference on Computer Vision and Pattern Recognition, 2005, that a simple color-and-texture-based classifier can do remarkably well at detecting nine different kinds of objects, ranging from cows to bicycles. Since some objects may be highly non-rigid, a dictionary-of-fragments-based method may require too large a dictionary to be practicable. This may change as storage space increases and processor speeds improve further. In one embodiment using three segmentation scales, three classifiers work on the three scales separately and are trained separately.

In some embodiments, the boosting classifier is designed for each scale separately. In other embodiments, however, the boosting classifier for each scale may constructively share appropriately-scaled information. In other embodiments, multiple boosting classifiers may be designed for each scale using different training sets such that their data can be integrated or not integrated depending on the image being analyzed. At each scale, feature vectors are computed for each segment. In one embodiment, the feature vector is composed of histograms of intensity, color, and texture. To measure texture, Gabor filters may be used, for example at 6 orientations and 4 scales. A histogram of the energy of the output of these filters over each segment may be computed. For example, one may use a 100-bin 2D histogram for hue and saturation and a 10-bin histogram for intensity. For Gabor filter energies, an 11-bin histogram may be used. In the embodiment using the numbers described, this gives 100+10+6×4×11=374 features. The number of features in other embodiments may be more or less, depending on the application.

Boosting may facilitate classification of the segments given by the bottom-up segmentation algorithm into object and background. Boosting has proven to be a successful classification algorithm in these applications as demonstrated in "Additive logistic regression: A statistical view of boosting," by J. Friedman, T. Hastie, and R. Tibshirani, Annals of Statistical, 2000, and in "Sharing visual features for multiclass and multiview object detection," by A. Torralba, K. P. Murphy, and W. T. Freeman, IEEE Transactions on Pattern Analysis and Machine Intelligence, vol. 29, No. 5 May 2007. Boosting fits an additive classifier of the form $$H(v) = \sum_{m=1}^{M} h_m(v),$$

where $v$ is the component feature vector, M is number of boosting rounds, and $$H(v) = \log\left(\frac{P(x=1 \mid v)}{P(x=-1 \mid v)}\right)$$

is the log-odds of component label x being +1 (object) as against −1 (background). This gives $$P(x=1 \mid v) = \frac{1}{1 + e^{-H(v)}}.$$

It is to be noted that each of the M, $h_m(v)$ terms acts on a single feature of the feature vector and hence is called a weak classifier and the joint classifier, $H(v)$, is called a strong classifier. In some embodiments, M is the same as the number of features. Thus, boosting optimizes the following cost function one term of the additive model at a time:

$$J = E[e^{-xH(v)}]$$

where E denotes the expectation. The exponential cost function $e^{-xH(v)}$ can be thought of as a differentiable upper bound on the misclassification error $1_{|H(v)<0|}$ which takes the value 1 when $xH(v)<0$ and 0 otherwise. The algorithm chosen to minimize J is, in one embodiment, based on gentleboost as discussed in "Additive logistic regression" (see above) because it is numerically robust and has been shown experimentally to outperform other boosting variants for tasks like face detection. Other boosting methods may be used in embodiments of the invention. Additionally, other methods of object classification not based on boosting may be employed in top-down portions of the algorithm. In gentle boost, the optimization of J is done using adaptive Newton steps, which corresponds to minimizing a weighted squared error at each step. For example, suppose there is a current estimate $H(v)$ and one seeks an improved estimate $H(v)+h_m(v)$ by minimizing $J(H+h_m)$ with respect to $h_m$. Expanding $J(H+h_m)$ to second order about $h_m=0$, $$J(H+h_m) = E[e^{-x(H(v)+h_m(v))}] \approx E[e^{-xH(v)}(1 - xh_m + h_m(v)^2/2)].$$

Note that $x^2=1$, regardless of the positive or negative value of x. Minimizing point-wise with respect to $h_m(v)$, we find, $$h_m = \underset{h}{\operatorname{argmin}} E_w(1 - xh(v) + h(v)^2/2)$$

$$h_m = \underset{h}{\operatorname{argmin}} E_w(x - h(v))^2,$$

where $E_w$ refers to the weighted expectation with weights $e^{-xH(v)}$. By replacing the expectation with an average over the training data, and defining weights $w_i = e^{-x_i H(v_i)}$ for training example i, this reduces to minimizing the weighted squared error:

$$J_{se} = \sum_{i=1}^{N} w_i(x_i - h_m(v_i))^2,$$

where N is the number of samples.

The form of the weak classifiers $h_m$ may be, for example, the commonly used one, $a\delta(v^f > \theta) + b\delta(v^f \leq \theta)$, where f denotes the $f^{th}$ component of the feature vector v, $\theta$ is a threshold, $\delta$ is the indicator function, and a and b are regression parameters. In other embodiments, different forms of the weak classifiers are used. Minimizing $J_{se}$ with respect to $h_m$ is equivalent to minimizing with respect to its parameters. A search may be done over all possible feature components f to act on and for each f over all possible thresholds $\theta$. Given optimal f and $\theta$, a and b may be estimated by weighted least squares or other methods. That gives, $$a = \frac{\sum_i w_i x_i \delta(v_i^f > \theta)}{\sum_i w_i \delta(v_i^f > \theta)}$$

and $$b = \frac{\sum_i w_i x_i \delta(v_i^f \leq \theta)}{\sum_i w_i \delta(v_i^f \leq \theta)}.$$

This weak classifier may be added to the current estimate of joint classifier $H(v)$. For the next round of update, the weights on each training sample become $w_i e^{x_i h_m(v_i)}$. It can be seen that weight increases for samples which are currently misclassified and decreases for samples which are correctly classified. The increasing weight for misclassified samples is a oft-seen feature of boosting algorithms.

In some embodiments of the method, segments are considered as foreground or background only when they have at least 75% of pixels labeled as foreground or background respectively. In other embodiments, only a majority of the pixels needs to be labeled as foreground or background to have the segments considered as foreground or background respectively. In still other embodiments, a third label may be applied to ambiguous segments having a significant proportion of both foreground and background pixels.

Fusion of Bottom-Up and Top-Down Segmentation

The segments produced by the multi-scale bottom-up segmentation are used, conceptually, to build a tree where a node (or nodes) corresponding to a segment at one level connects to a node at a higher level corresponding to the segment with the most common pixels. The result, as can be seen in FIG. 4, is a collection of trees, since the nodes at the highest level have no parents. One may also consider the highest nodes to all connect to a single node representing a segment which encompasses the entire image. The edges (or lines connecting the child and parent nodes) are assigned a weight to reflect the degree of the coupling between the parent and child nodes. It is possible that components at a higher level are formed by the merger of background and foreground components at a lower level. In that case, the label of the parent should not affect the label of the children. Therefore the edges are weighted by the similarity between the features of the two components. The similarity may be calculated from a Euclidean distance between the two feature vectors. Other methods, as discussed above, may also be used. A conditional random field (CRF) structure is obtained by assigning conditional probabilities based on the edge weights. If the weight of the edge connecting node j to its child node i is $\lambda_{ij} = e^{-\|f_i - f_j\|^2}$, the conditional probability distribution of node i given node j is $$P_{ij} = \begin{bmatrix} e^{a\lambda_{ij}} & e^{-a\lambda_{ij}} \\ e^{-a\lambda_{ij}} & e^{a\lambda_{ij}} \end{bmatrix}.$$

where a is a constant scale factor, e.g. 1. In some embodiments, particular those using mathematical probabilities, the columns are normalized so that they sum to one. Fusion of bottom-up segmentation with top-down segmentation is done by using the bottom-up segmentation to give an a prior probability distribution for the final segmentation, X, based on the CRF structure. The top-down segmentation likelihood given by the boosting classifier is considered as the observation likelihood. Conditioned on the parent nodes, the segment nodes in a level are independent of each other. Let X denote the segment labels for all nodes in all levels. The prior probability of X from the bottom-up segmentation is given by, $$P(X \mid B) = \prod_{l=1}^{L-1} \prod_{i=1}^{N_l} P(X_i^l \mid \pi(X_i^l)),$$

where $X_i^l$ denotes the ith node at the lth level, $N_l$ is the number of segments at the lth level and L is the number of levels. Stated another way, the probability that a certain labeling is correct from the bottom-up segmentation alone is based on the product of the probabilities that a labeling is correct for each node. Note that the nodes at the highest level are not included as they lack parent nodes. One aspect of the invention provides fusion of the bottom-up and top-down information. Thus, it provides the probability a segment labeling is correct given both B, the bottom-up information, and T, the top-down information. One may denote this probability as P(X|B,T). This step may be calculated using mathematical probabilities and Bayes' rule as shown below, or by using other methods.

$$P(X \mid B, T) = \frac{P(X \mid B) P(T \mid X, B)}{P(T \mid B)}$$

Figure 5:
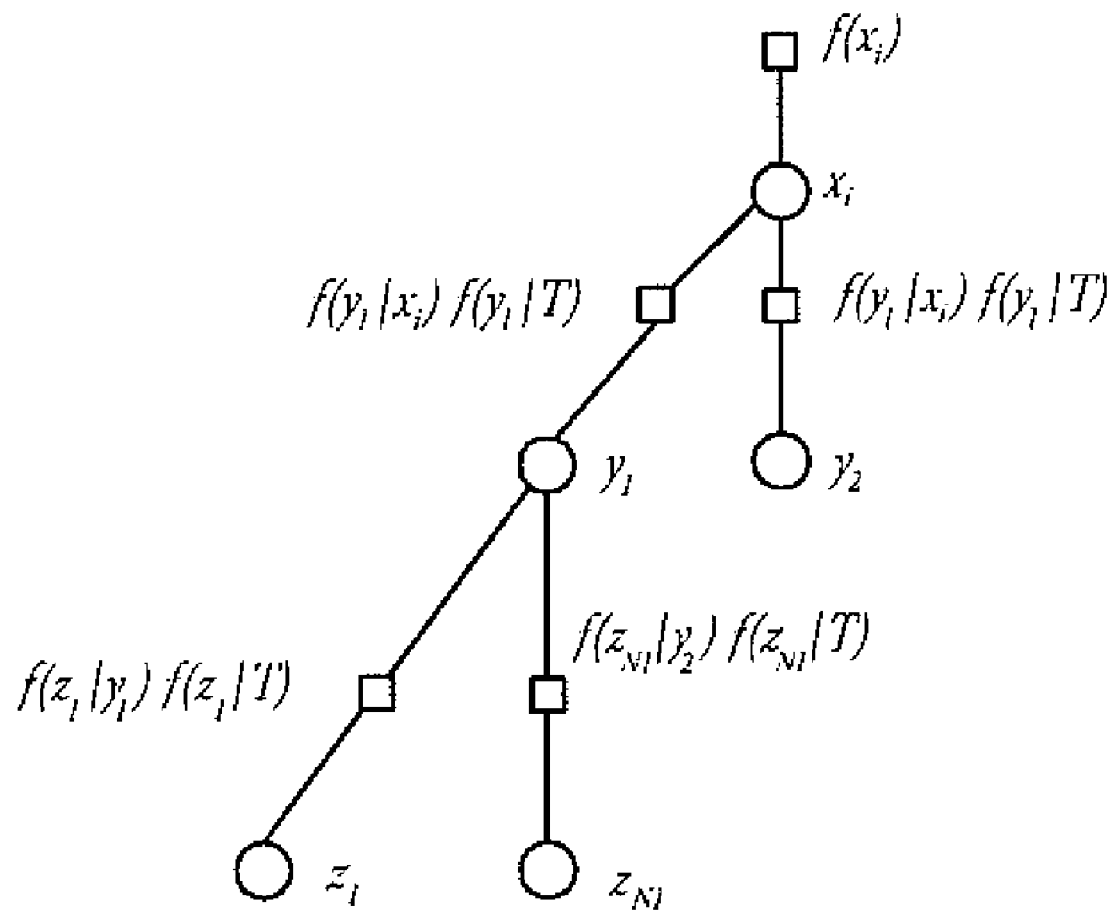
FIG. 5 is an exemplary factor graph corresponding to a conditional random field used for fusing the bottom-up and top-down segmentation information.

Final segmentation is found by maximizing P(X|B,T) with respect to X which is equivalent to maximizing P(X|B)P(T|X, B). The top-down term P(T|X,B) may be obtained from the boosting classifier. Since the top-down classifier acts on the segments independently of each other, the resulting probabilities are assumed to be independent.

$$P(T \mid X, B) = \prod_{l=1}^{L} \prod_{i=1}^{N_l} \frac{1}{1 + e^{-H(v_i^l)}},$$

where $H(v_i^l)$ is the output of the boosting classifier for the ith node at the lth level. The maximization of P(X|B,T) may be done by a factor-graph-based inference algorithm such as the max-sum algorithm or sum-product algorithm. The tree may also be conceptualized as a factor graph of the form shown in FIG. 5. FIG. 5 is an exemplary factor graph corresponding to a conditional random field used for fusing the bottom-up and top-down segmentation information. The nodes labeled with the letters x, y, and z correspond respectively to the third, second, and first level segments and $N_j$ denotes the number of child nodes of node $y_j$. A factor graph can be used by introducing factor nodes (represented in the figure as square nodes). Each factor node represents the function product of the bottom-up prior probability term and the top-down observation likelihood term. The max-sum algorithm exploits the conditional independence structure of the CRF tree which gives rise to the product form of the joint distribution. This algorithm finds the posterior probability distribution of the label at each node by maximizing over the label assignment at all the other nodes. Because of the tree structure, the algorithm complexity is linear in the number of segments and the inference is exact. Alternatively, one may use a variation that finds the marginal posterior probability of each node label $x_i$ from the joint probability P(X|B,T) by summing over other nodes. For this variation, one may use the sum-product form of the algorithm.

Integrating Edge Information

Edge detection based on low-level cues such as gradient alone is not the most robust or accurate algorithm. However, such information may be employed and useful in some embodiments of the invention. "Supervised learning of edges and object boundaries," by P. Dollár, Z. Tu, and S. Belongie, IEEE Conference on Computer Vision and Pattern Recognition, June 2006, introduces a novel supervised learning algorithm for edge and boundary detection which is referred to as Boosted Edge Learning (BEL). The decision of an edge is made independently at each location in the image. Multiple features from a large window around the point provides significant context to detect the boundary. In the learning stage, the algorithm selects and combines a large number of features across different scales in order to learn a discriminative model using the probabilistic boosting tree classification algorithm. Ground truth object boundaries needed for the training may be derived from the ground truth figure-ground labels used for training the boosting classifier for top-down segmentation. In other embodiments, different training may be used for the edge detector and the top-down classifier. The figure-ground label map may be converted to the boundary map by taking the gradient magnitude. Features used in the edge learning classifier include gradients at multiple scales and locations, differences between histograms computed over filter responses (difference of Gaussian (DoG) and difference of offset Gaussian (DooG)) at multiple scales and locations, and also Haar wavelets. Features may also be calculated over each color channel. Other methods of handling color images may be employed, including analysis of the hue, saturation, and/or intensity rather than color channels.

Having obtained the posterior probability distribution, to arrive at the final segmentation at the finest scale, one can assign to each component at the finest scale the label with the higher probability. This is known as a maximum a posteriori or MAP decision rule. When label assignment is per segment, there may be instances of mislabeling some pixels in those segments which contain both background and foreground. This may also occur in some segments because of the limitations of the bottom-up segmentation. Some embodiments of the invention provide a solution to this problem by formulating a pixel-wise label assignment problem which maximizes the posterior probability of labeling while honoring the figure-ground boundary. The figure-ground boundary information is obtained at the finest scale from the Boosting-based Edge Learning described in the previous section. BEL is trained to detect the figure-ground boundary of the object under consideration.

Given the probability distribution given the bottom-up and top-down information, P(X|B,T) and the edge probability given the image I, P(e|I), from the Boosting-based Edge Detector, one may define the energy of a binary segmentation map at the finest scale, $X_1$ as:

$$E(X_1; I) = v \sum_{\{p,q\} \in N} V_{p,q}(X_p, X_q) + \sum_{p \in P_L} D_p(X_p),$$

where $V_{p,q}$ is a smoothness cost, $D_p$ is a data cost, N is a neighborhood set of interacting pixels, $P_1$ is the set of pixels at the finest scale and v is the factor which balances smoothness cost and data cost. One may use, for example, a 4-connected grid neighborhood and v=125. There is a joint probability associated with the energy which can be maximized by minimizing the energy with respect to the labels. The data cost may be, for example, $D_p(X_p=1)=P(X_p=0|B,T)$ and $D_p(X_p=0)=P(X_p=1|B,T)$. This will enforce the label that has higher probability. Smoothness of the labels may be enforces while preserving discontinuity at the edges, for instance, by using Potts' model.

$$V_{p,q}(X_p, X_q) = \begin{cases} 0 & \text{if } f_p = f_q \\ w_{p,q} & \text{if } f_p \neq f_q \end{cases}$$

where $w_{p,q}=\exp(-a*\max(P(e_p|I), P(e_q|I)))$, $P(e_p|I)$ and $P(e_q|I)$ are the edge probabilities at pixels p and q, and a is a scale factor, e.g. 10. Final segmentation may be obtained from the label assignment which minimizes this energy function. The minimization may be, for example, carried out by a graph-cuts-based algorithm described in "Fast approximate energy minimization via graph cuts," by Y. Boykov, O. Veksler, and R. Zabih, *IEEE Transactions on Pattern Analysis and Machine Intelligence*, November 2001. The algorithm efficiently finds a local minimum with respect to a type of large moves called alpha-expansion moves and can find a labeling within a factor of two from the global minimum.

CONCLUSION

Disclosed herein, inter alia, is a method of segmenting class-specific objects from images combining three different cues which use low-level and mid-level image cues and knowledge of the specific object class and its properties. Low-level and mid-level information are used both in the graph-based bottom-up segmentation and the boosting-based edge learning machine (BEL). The object knowledge is used in the boosting-based top-down segmentation classifier. At all stages, information may be extracted at a number of different scales. A factor-graph-based inference algorithm may be used to fuse the bottom-up and top-down segmentations at multiple scales in a conditional random field framework. The resulting posterior probability can be combined with a BEL-derived smoothness prior to form an energy function which may be optimized using, for example, a graph-cuts-based algorithm.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method for processing an image, comprising:
   receiving digitized data representing the image, the digitized data comprising a plurality of pixels;
   segmenting the pixels segments at a plurality of scale levels;
   determining feature vectors of the segments at the plurality of the scale levels, the feature vectors comprising one or more measures of visual perception of the segments;
   determining one or more similarities, each similarity determined by comparing two or more of the feature vectors;
   determining for each of a first subset of the segments, which is acquired through a bottom-up segmentation, a first measure of probability that the segment is a member of an object class;
   determining probability factors based on the determined first measures of the probability and similarity factors based on the determined similarities; and
   performing factor graph analysis to determine a second measure of probability for each of a second subset of the segments, which is acquired through a top-down segmentation, based on the probability factors and the similarity factors; wherein each of the second subset of segments are variable nodes in the factor graph analysis and the factor nodes between the variable nodes at the different scale levels are computed from the similarity factors and the probability factors, wherein each of the factor nodes represents a function product of a bottom-up prior probability term computed from the first subset of the segments, and a top-down observation likelihood term computed from the second subset of segments.

2. The method of claim 1, further comprising classifying at least one segment as either being a member of an object class or not a member of an object class based on the determined second measure of probability.

3. The method of claim 2, wherein classifying at least one segment comprises maximizing the second measure of probability at the finest scale level.

4. The method of claim 1, wherein determining the first measure of probability comprises using one or more learned boosting classifier models generated for the object class.

5. The method of claim 4, further comprising generating the one or more learned boosting classifier models based on images comprising predetermined object class segments and non-object class segments.

6. The method of claim 4, wherein the one or more learned boosting classifier models comprises a learned boosting classifier model generated for each of the plurality of scale levels.

7. The method of claim 1, wherein one of the segments at a first scale level in the factor graph analysis is connected via the edges with two or more of the segments at a second scale level in the factor graph analysis, where the second scale level is a finer scale than the first scale level.

8. The method of claim 1, further comprising:
determining one or more candidate segment label maps, wherein the candidate segment label maps identify different sets of segments as being members of the object class;
for the candidate segment label maps, identifying pairs of pixels bordering edges of neighboring object class segments, and calculating a measure indicative that the identified pairs of pixels are edge pixels between an object class segment and a non-object class segment; and
for the candidate segment label maps, generating an energy function based on the second measure of probability and the calculated edge pixel measure, wherein the energy function (1) rewards labeling a segment according to the second measure of probability, and (2) penalizes labeling two neighboring segments as object class segments based on the edge pixel measure.

9. The method of claim 8, further comprising classifying the segments as being members of the object class based on the energy functions of the candidate segment label maps.

10. The method of claim 9, wherein the energy function comprises a first cost component and a second cost component, the first cost component increasing the energy function proportionally to the edge pixel measure, and the second cost component increasing the energy function more for classifying segments contrary to the second measure of probability than for classifying segments in accordance with the second measure of probability, the method further comprising classifying the segments based on minimizing the energy function.

11. The method of claim 8, wherein calculating the edge pixel measure comprises using a learned boosting classifier algorithm generated to identify edges between object class segments and non-object class segments.

12. The method of claim 11, further comprising generating the edge identifying learned boosting classifier model based on images comprising predetermined object class segments and non-object class segments.

13. A system for processing an image, comprising:
a video subsystem configured to receive digitized data representing the image, the digitized data comprising a plurality of pixels;
an image segmentation subsystem configured to segment the pixels into segments at a plurality of scale levels;
a perceptual analysis subsystem configured to determine feature vectors of the segments at the plurality of the scale levels, the feature vectors comprising one or more measures of visual perception of the segments, and to determine one or more similarities, each similarity determined by comparing two or more of the feature vectors;
an object classification subsystem configured to determine, for each of a first subset of the segments, which is acquired through a bottom-up segmentation, a first measure of probability that the segment is a member of an object class; and
a statistical analysis subsystem configured to determine probability factors based on the determined first measures of the probability and similarity factors based on the determined similarities and further configured to perform factor graph analysis to determine a second measure of probability for each of a second subset of the segments, which is acquired through a top-down segmentation, based on the probability factors and the similarity factors; wherein each of the second subset of the segments are variable nodes in the factor graph analysis and the factor nodes between the variable nodes at different scale levels are computed from the similarity factors and the probability factors, wherein each factor node represents a function product of a bottom-up prior probability term computed from the first subset of the segments, and a top-down observation likelihood term computed from the second subset of segments.

14. The system of claim 13, wherein the object classification subsystem is further configured to classify at least on segment as either being a member of an object class or not a member of an object class based on the determined second measure of probability.

15. The system of claim 14, wherein the object classification subsystem is further configured to classify at least one segment based on maximizing the second measure of probability at the finest scale level.

16. The system of claim 15, wherein the object classification subsystem is configured to determine the first measure of probability using one or more learned boosting classifier models generated for the object class.

17. The system of claim 16, wherein the object classification subsystem is further configured to generate the one or more learned boosting classifier models based on images comprising predetermined object class segments and non-object class segments.

18. The system of claim 16, wherein the one or more learned boosting classifier models comprises a learned boosting classifier model generated for each of the plurality of scale levels.

19. The system of claim 13, wherein one of the segments at a first scale level in the factor graph analysis is connected via the edges with two or more of the segments at a second scale level in the factor graph analysis, where the second scale level is a finer scale than the first scale level.

20. The system of claim 13, wherein the object classification subsystem is further configured to determine one or more candidate segment label maps, wherein the candidate segment label maps identify different sets of segments as being members of the object class, the system further comprising:
an edge information subsystem configured to, for the candidate segment label maps, identify pairs of pixels bordering edges of neighboring object class segments, and calculate a measure indicative that the identified pairs of pixels are edge pixels between an object class segment and a non-object class segment, and
wherein the statistical analysis subsystem is further configured to, for the candidate segment label maps, generate an energy function based on the second measure of probability and the calculated edge pixel measure, wherein the energy function (1) rewards labeling a segment according to the second measure of probability, and (2) penalizes labeling two neighboring segments as object class segments based on the edge pixel measure.

21. The system of claim 20, wherein the object classification subsystem is further configured to classify the segments as being members of the object class based on the energy functions of the candidate segment label maps.

22. The system of claim 21, wherein the energy function comprises a first cost component and a second cost component, the first cost component increasing the energy function proportionally to the edge pixel measure, and the second cost component increasing the energy function more for classifying segments contrary to the second measure of probability than for classifying segments in accordance with the second measure of probability, and wherein the object classification subsystem classifies the segments based on minimizing the energy function.

23. The system of claim 20, wherein the edge information subsystem calculates the edge pixel measure using a learned boosting classifier algorithm generated to identify edges between object class segments and non-object class segments.

24. The system of claim 23, wherein the edge information subsystem is further configured to generate the edge identifying learned boosting classifier model based on images comprising predetermined object class segments and non-object class segments.

* * * * *